United States Patent [19]

Lauria

[11] Patent Number: 4,678,824
[45] Date of Patent: Jul. 7, 1987

[54] REMOISTENABLE ADHESIVE COMPOSITIONS

[75] Inventor: Vincent A. Lauria, Somerville, N.J.

[73] Assignee: National Starch and Chemical Corporation, Bridgewater, N.J.

[21] Appl. No.: 829,599

[22] Filed: Feb. 13, 1986

[51] Int. Cl.$^4$ .................. C08L 3/02; C08J 3/02; C09J 3/06
[52] U.S. Cl. .................. 524/48; 524/732; 156/328; 156/336
[58] Field of Search .......... 524/48, 732, 734, 27; 156/328, 336

[56] References Cited

U.S. PATENT DOCUMENTS

| | | | |
|---|---|---|---|
| 2,808,381 | 10/1957 | Stone | 524/48 |
| 3,200,091 | 8/1965 | Sederlund et al. | 524/21 |
| 3,271,336 | 9/1966 | Warson et al. | 524/734 |
| 3,355,322 | 11/1967 | Worrall et al. | 428/514 |
| 3,365,320 | 1/1968 | Minelli | 524/48 |
| 3,642,774 | 2/1972 | Schobinger et al. | 524/48 |
| 3,734,819 | 5/1973 | Knutson | 156/332 |
| 3,954,687 | 5/1976 | Wiest et al. | 524/48 |
| 4,140,668 | 2/1979 | Sumi et al. | 526/330 |
| 4,575,525 | 3/1986 | Wacome et al. | 524/48 |

FOREIGN PATENT DOCUMENTS 726927 3/1955 United Kingdom .

Primary Examiner—John Kight
Assistant Examiner—Nathan M. Nutter
Attorney, Agent, or Firm—Ellen T. Dec; Edwin M. Szala

[57] ABSTRACT

Remoistenable adhesive compositions are prepared by adding to ethylene vinyl acetate resin latices which have been polymerized utilizing dextrin as the protective colloid sufficient phosphoric acid to lower the pH to about 2.

7 Claims, No Drawings

REMOISTENABLE ADHESIVE COMPOSITIONS

The present invention is directed to remoistenable adhesive compositions, particularly remoistenable adhesives for use as front-seals in the manufacture of envelopes. The adhesive compositions comprise a dextrin emulsified ethylene vinyl acetate copolymer to which phosphoric acid and conventional components are post-added.

Conventional remoistenable adhesives for use as "front-seal" adhesives on envelopes have generally been prepared from either of two adhesive systems. The first class of adhesives are those prepared by the addition of dextrin, plasticizer and other additives to dextrin emulsified vinyl acetate homopolymers; the second class are based primarily on homo- or copolymers of polyvinyl acetate which has been emulsified with polyvinyl alcohol and to which additional polyvinyl alcohol and plasticizer are post-added. Recently, in U.S. Pat. No. 4,575,525 issued Mar. 11, 1986, there were disclosed remoistenable adhesive compositions prepared by post-addition of conventional additives to ethylene vinyl acetate copolymers which had been polymerized using dextrin as the emulsifier or protective colloid. The latter adhesives were prepared using relatively high levels of the expensive ethylene vinyl acetate copolymer since adequate adhesion properties were not obtained with adhesives containing less than about 55% by weight of the copolymer.

I have now found that the addition to the adhesives formulated with the dextrin emulsified ethylene vinyl copolymers of sufficient phosphoric acid to lower the pH to about 2 substantially improves the adhesion properties thereof and permits formulation of satisfactory remoistenable adhesive compositions using as little as about 15% by weight of the dextrin emulsified ethylene vinyl acetate copolymer. Moreover, the resultant adhesives which generally contain phosphoric acid in amounts of less than about 1% exhibit superior remoistening tack, i.e., they rapidly build up tack strength on remoistening.

Thus the present invention is directed to remoistenable adhesive compositions comprising at least 15% by weight of a dextrin emulsified vinyl acetate resin latex having a $T_g$ of at least about 0° C.; 0.5-5% humectant; and sufficient phosphoric acid to lower the pH to about 2; with the remainder of the composition (to 100% by weight) comprising dextrin and water.

The dextrin emulsified ethylene vinyl acetate copolymers utilized herein are those containing ethylene in amounts which provide a $T_g$ (glass transition temperature) of at least about 0° C. It is generally accepted that polyvinyl acetate has a $T_g$ of 30° C. By addition of increasing amounts of ethylene, it is possible to lower the $T_g$ value to the desired level. When ethylene is added to a level whereby the $T_g$ is reduced below about 0° C., blocking becomes a problem. Blocking is an undesirable phenonmenon which results when the coated substrates, such as the envelopes, are stored and exposed to varying degrees of humidity resulting in the tendency of the adjacent surfaces of the stacked substrates to adhere to one another. The choice of the particular $T_g$ to be used in the adhesive formulation will depend, in part, on the desired end use (i.e. the stock to which the adhesive is to be applied) as well as on whether or not dextrin is post-added to the adhesive system. Thus, if no additional dextrin is added, softer adhesive bases (i.e. those having $T_g$ values at the lower end of the range) may be desired in order to obtain adequate adhesion.

As to the dextrin utilized herein, the dextrin may be derived from any of the available starch bases, including, but not limited to, waxy maize, waxy sorghum, sago, tapioca, potato, corn, sorghum, rice and wheat as well as the derivatives thereof. In all instances, however, the applicable starch base should be in ungelatinized form and shoul remain in that form throughout the subsequent dextrinization process.

In converting these starch bases into dextrins, one may employ any of the usual dextrinization procedures well known to those skilled in the art, including treatment of starch with either heat or acid or by any other means desired by the practitioner. It should be noted that when reference is made to "dextrins" in the process of this invention, we also contemplate as included therein the degraded starch products prepared either by means of a process wherein the applicable starches are converted with acids and/or oxidizing agents, in the presence of water, at superatmospheric pressures and temperatures in excess of about 212° F., or, by means of an enzyme conversion procedure utilizing such enzymes as alpha-amylase. Additional information relating to the dextrinization of starches, may also be obtained by reference to chapters XII–XIII of "Chemistry and Industry of Starch" edited by R. W. Kerr, published in 1950 by the Academic Press of New York, N.Y.

While the choice of the particular dextrin to be used is left to the practitioner, it is preferred that the same dextrin base used as the protective colloid in the polymerization process be used as the post-added dextrin component in formulating the adhesives of the preferred embodiment.

The adhesive polymer base is prepared by conventional ethylene vinyl acetate polymerization procedures with the one difference being the use of an aqueous solution of dextrin as the emulsifier or protective colloid. The polymerization is then carried out in an aqueous medium under pressures less than about 130 atmospheres in the presence of a catalyst with the pH being maintained by a suitable buffering agent, if necessary, at a pH of 2 to 6. The polymerization is performed at conventional temperatures from about 70° to 225° F., preferably from 120° to 175° F. for sufficient time to achieve a low monomer content, e.g. from about 0.5 to 120 hours, preferably from 2 to 8 hours, to produce a latex having less than 1.5, preferably less than 0.5 weight percent free monomer. Conventional batch, semi-continuous or continuous polymerization procedures may be employed and are taught, for example, in U.S. Pat. Nos. 3,708,388 and 4,164,488.

More specifically, a solution of the dextrin in water, typically at a concentration of 30 to 50% solids, is prepared in a polymerization vessel and a portion of the vinyl acetate monomer charged therein. After purging the reactor with nitrogen, the polymerization is then initiated by water soluble free radical initiator such as water soluble peracid or salt thereof, e.g. hydrogen peroxide, sodium peroxide, lithium peroxide, peracetic acid, persulfuric acid or the ammonium and alkali metal salts thereof, e.g. ammonium persulfate, sodium peracetate, lithium persulfate, potassium persulfate, sodium persulfate, etc. A suitable concentration of the initiator is from 0.05 to 5.0 weight percent and preferably from 0.1 to 3 percent based on the weight of the monomer.

The free radical initiator can be used alone and thermally decomposed to release the free radical initiating species or can be used in combination with a suitable reducing agent in a redox couple. The reducing agent is typically an oxidizable sulfur compound such as an alkali metal metabisulfite and pyrosulfite, e.g. sodiuum metabisulfite, potassium metabisulfite, sodium pyrosulfite, etc. The reducing agent is generally added towards the end of the polymerized and is used in an amount of from about 0.1 to 3 weight percent of the amount of polymer.

The ethylene content of the copolymer is determined by controlling the ethylene content of the aqueous polymerization medium. This may be accomplished by precharging the desired amount of ethylene into the reactor and allowing the reaction to proceed in the closed reaction vessel or by regulating the partial pressure of ethylene in the vapor phase over the medium, the temperature of polymerization and the degree of mixing between the vapor phase and the liquid medium. The polymerization is generally performed at temperatures from 120° to 175° F. and, at these temperatures if the ethylene was not precharged, ethylene partial pressures from 50 to 1,000 preferably from 250 to 750 psig. are sufficient to incorporate from 1 to 30, preferably from 5 to 25, weight percent ethylene in the polymer. The reaction medium is preferably agitated with a stirrer, however, other agitation can be used. The preferred copolymerization procedure is a batch process wherein the appropriate amount of ethylene is precharged into the reactor, the vessel closed and the reaction allowed to proceed over the polymerization period which can be from 0.5 to about 120 hours, preferably from about 2 to about 8 hours.

In addition to the required dextrin solution used as a protective colloid, other emulsfiers, generally of the nonionic and anionic oil-in-water variety may also be used in the polymerization reaction. When used, it is generally present in amounts of 0.1 to 1 percent of the monomers used in the polymerization and is added either entirely to the initial charge or continously or intermittently during polymerization or as a post-reaction stabilizer.

The latices are produced and used at relatively high solids contents, e.g. between 35 and 75% although they may be diluted with water if desired. The preferred contents of total solids are from 40 to 70, and, most preferred, from 50 to about 68 weight percent. When used herein the term "solids" refers to the combined amounts of ethylene vinyl acetate resin, dextrin and other non-violatiles present in the latex.

The particle size of the latex can be regulated by the quantity and type of the emulsifying agent or agents employed. To obtain smaller particles sizes, greater amounts of emulsifying agents are used. As a general rule, the greater the amount of the emulsifying agent employed, the smaller average particle size.

The humectant used herein may be any of those conventionally used in formulating remoistenable "front seal" adhesives. Typically included in this class are sugars; sorbitol; glycerine and related derivatives; carbowaxes; propylene glycol and similar related glycols; and the glycol ethers. These humectants are used in the adhesive formulations at levels of about 0.5 to 5% by weight of the total adhesive formulation.

The phosphoric acid component is added to the adhesive composition in a quantity sufficient to lower the pH to about 2. In general, this pH level can be obtained using concentrated phosphoric acid in an amount of 1% by weight of the adhesive fonmulation. pH values substantially less than about 2 are not desired while at pH values substantially greater than 2 adequate adhesion may not be obtained in those compositions containing lower levels of the dextrin emulsified ethylene vinyl acetate. While it will be recognized that other acids may be used to lower the pH, the relative acid strength and lack of volatility make phosphoric acid the most preferred choice.

In the preferred embodiment where dextrin is post-added to the latex, the dextrin may be added at levels up to about 60% by weight, preferably about 30 to 55% by weight of the adhesive formulation.

In preparing the adhesive composition, an aqueous solution of the dextrin may be prepared and added to the ethylene vinyl acetate latex or the dry dextrin added directly to the latex. The adhesive composition is then heated and maintained at a temperature of about 160°-180° F. with agitation for a period sufficient to ensure complete dissolution. The phosphoric acid and any other additives which are to be employed would be added at this point and the resulting mixture then diluted with additional water, if necessary, to the desired viscosity, generally in the range of about 2,000 to 15,000 cps., preferably about 6000 cps. In the embodiment wherein dextrin is not post-added, it may be necessary to add a thickener (e.g. polyacrylamide, carboxymethyl cellulose, hydroxyethylcellulose, etc.) in order to obtain a viscosity within these limits. Various optional additives, such as plasticizers, preservatives, thickeners, bleaching agents, etc. may also be present in the adhesive compositions in order to modify certain characteristics thereof.

Although the humectant component and the optional additional dextrin have been referred to as being "post-added", it should be recognized that the post-addition is merely the most convenient and generally accepted method of formulating "front" seal adhesives and that it is possible to add the humectant and the additional dextrin directly to the monomer charge prior to the actual polymerization.

In the examples that follow, an adhesive was prepared from ethylene vinyl acetate base which had been polymerized using dextrin as a protective colloid in accordance with the following basic procedure. In the examples, the amount of ethylene to achieve a desired Tg of 6.5 was used. ($T_g$ values are determined by differential thermal analysis using a DuPont Model 910 Differential Scanning Calorimeter.)

A premix cooker was charged with 1200 parts water and 778 parts dextrin dissolved therein with agitation. Then 5.23 parts Aerosol OT (surfactant), 12.1 parts Colloid 681F (defoamer), 2.4 parts sodium bicarbonate and 6.2 parts sodium persulfate were added with 729 parts of vinyl acetate and this initial charge transferred to a reactor together with 73 parts water. While at room temperature, the pressure was brought to 600 pounds with ethylene, held for one half hour to equilibrate and then the temperature was raised to 75° C. Polymerization was initiated and a slow addition of solutions of 16.7 parts sodium bicarbonate in 175 parts water and 15.6 parts sodium persulfate in 109 parts water was begun. The temperature was held at 80° C. and the reaction allowed to continue to a solids level of 45% at which time a delayed addition of 1460 parts vinyl acetate was begun and continued over a four hour period. The catalyst and activator solution slow additions continued for an additional one half hour to achieve a 65% solids level. The latex was stripped of residual ethylene and degassed. The resultant latex had a total solids content of 64%, a $T_g$ of 6.5, a pH of 4.6, residual monomer content of 1.5 and a viscosity of 2050 cps.

In this example, a variety of moistenable adhesive compositions shown in Table I were prepared with and without phosphoric acid using varying amounts of ethylene vinyl acetate polymers prepared as above. As a control, a similar adhesive was prepared using 65% of dextrin emulsified polyvinyl acetate following the teachings of copending patent application Ser. No. 668,603. In all cases, additional water was added in an amount sufficient to dilute the samples to a viscosity of 6,000 cps.

TABLE I

|  | A | B | C | D | E | F | G | H | I | J | K |
|---|---|---|---|---|---|---|---|---|---|---|---|
| EVA | 65 | 55 | 55 | 45 | 45 | 35 | 35 | 25 | 25 | 15 | 15 |
| Water | 6 | 8 | 8 | 10 | 10 | 12 | 12 | 15 | 15 | 18 | 18 |
| Defoamer | 0.3 | 0.3 | 0.3 | 0.3 | 0.3 | 0.3 | 0.3 | 0.3 | 0.3 | 0.3 | 0.3 |
| Phosphoric Acid (86%) | — | — | 0.8 | — | 0.8 | — | 0.8 | — | 0.8 | — | 0.8 |
| Amioca Dextrin | 27 | 37 | 37 | 42 | 42 | 47 | 47 | 52 | 52 | 57 | 57 |
| Formaldehyde | 0.1 | 0.1 | 0.1 | 0.1 | 0.1 | 0.1 | 0.1 | 0.1 | 0.1 | 0.1 | 0.1 |
| Propylene Glycol | 3.1 | 3.1 | 3.1 | 3.1 | 3.1 | 3.1 | 3.1 | 3.1 | 3.1 | 3.1 | 3.1 |
| Solids (Cenco) | 70% | 67% | 65.4% | 66% | 66% | 64% | 65.6% | 64.8% | 64.8% | 62% | 64.2% |
| pH | 3.9 | 3.9 | 2.1 | 3.8 | 2.02 | 4.0 | 2.0 | 3.5 | 2.0 | 3.35 | 2.0 |

When tested for adhesion on texturized stocks and rag stocks, the samples containing phosphoric acid exhibited improved adhesion to the substrates when contrasted with those containing the same levels of ethylene vinyl acetate but lacking the phosphoric acid. The improved effects on adhesion imparted by the addition of phosphoric acid were especially pronounced after heating the samples at 225° F. for 2 hours and 300° F. for 15 minutes (to simulate aging). In these cases, the adhesion results observed even for Sample K (containing only 15% ethylene vinyl acetate) were superior to those for Sample A (containing 65% ethylene vinyl acetate). When tested for blocking resistance under high humidity conditions, the Control and Samples B–K exhibited satisfactory non-blocking.

A sample similar to that designated Sample G was tested on white wove and other stocks for relative remoistening tack strength using a Hunter-String guage. In this test, the adhesive samples were coated onto test paper at ½ inch width applications, dried for 72 hours, and cut into 1½ inch pieces. The strips were then remoistened with a dispenser that was modified with a pressure device to obtain consistent remoistening. Open time was set at 5 seconds and the remoistened strip comfined to a plain strip of the same type paper and ccmpressed. Strips were attached to the guage and peeled at predetermined time intervals to determine the relative tack development. The results indicated that the speed of tack development on these substrates was dramatically faster than that of the conventional dextrin emulsified vinyl acetate homopolymer based adhesives against which it was tested.

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

We claim:

1. Remoistenable adhesive compositions comprising at least 15% by weight of a dextrin emulsified ethylene vinyl acetate resin latex having a Tg of at least 0° C., 0.5–5% humectant, and sufficient phosphoric acid to lower the pH to about 2; the remainder of the composition comprising water and optional post-added dextrin.

2. The adhesive composition of claim 1 wherein the phosphoric acid is added in an amount of less than 1% by weight.

3. The adhesive composition of claim 1 wherein the dextrin emulsified ethylene vinyl acetate resin latex is present in an amount of 15 to 55% by weight.

4. The adhesive composition of claim 1 wherein the humectant is selected from the group consisting of sugars, sorbitol, glycerine and related derivatives, carbowax, propylene glycol and related glycols and glycol ethers.

5. The adhesive composition of claim 1 wherein the dextrin is amioca dextrin.

6. In a method for the preparation of a remoistenable adhesive composition comprising humectants and ethylene vinyl acetate resin latices which have been polymerized in the presence of dextrin as a protective colloid, the improvement which comprises adding thereto phosphoric acid in an amount sufficient to lower the pH to about 2.

7. The method of claim 6 wherein there is additionally present post-added dextrin.

* * * * *